United States Patent
Han

[11] Patent Number: 5,969,776
[45] Date of Patent: Oct. 19, 1999

[54] DISPLAY DEVICE AND METHOD OF ASSEMBLY

[75] Inventor: Sang-Hyun Han, Kyungki-do, Rep. of Korea

[73] Assignee: SamSung Electronics Co., Ltd., Suwon, Rep. of Korea

[21] Appl. No.: 08/974,801

[22] Filed: Nov. 20, 1997

[30] Foreign Application Priority Data

Nov. 21, 1996 [KR] Rep. of Korea ...................... 96-56175

[51] Int. Cl.⁶ ..................................................... H04N 5/64
[52] U.S. Cl. ...................... 348/836; 312/7.2; 312/223.1; 348/843
[58] Field of Search ..................................... 348/836, 839, 348/843; 312/7.2, 223.1, 223.2

[56] References Cited

U.S. PATENT DOCUMENTS

| | | | |
|---|---|---|---|
| 4,063,289 | 12/1977 | Veenendaal | 348/836 |
| 4,245,274 | 1/1981 | MacDonald et al. | |
| 4,459,640 | 7/1984 | Lastasiewicz et al. | |
| 4,853,790 | 8/1989 | Dickie | 348/836 X |
| 5,045,974 | 9/1991 | Ohkoshi et al. | |
| 5,122,928 | 6/1992 | Lo | |
| 5,294,994 | 3/1994 | Robinson et al. | 348/836 X |
| 5,363,150 | 11/1994 | Kojima | 348/843 X |
| 5,419,629 | 5/1995 | Korinsky | |
| 5,515,240 | 5/1996 | Rodeffer et al. | |
| 5,575,545 | 11/1996 | Wang | |
| 5,669,681 | 9/1997 | Ishikawa et al. | 312/7.2 |
| 5,682,300 | 10/1997 | Sung | 312/7.2 X |
| 5,742,360 | 4/1998 | Kwon et al. | 312/223.1 X |

Primary Examiner—Peter M. Cuomo
Assistant Examiner—Stephen Vu
Attorney, Agent, or Firm—Robert E. Bushnell, Esq.

[57] ABSTRACT

A display device is assembled so that access to the main PCB assembly is simplified. The rear housing covers the assembly; and once removed only the top shield has to be removed to expose the top of the main PCB assembly. After the top is removed the stand and bottom bracket can be easily removed, to gain access to the bottom of the main PCB assembly. This display device allows for the testing, repairing, and replacing of individual components of the main PCB without having to remove any of the side PCB assemblies. This allows repairs to be made in less time, at a lower cost, and increases the market competitiveness of the display device.

22 Claims, 8 Drawing Sheets

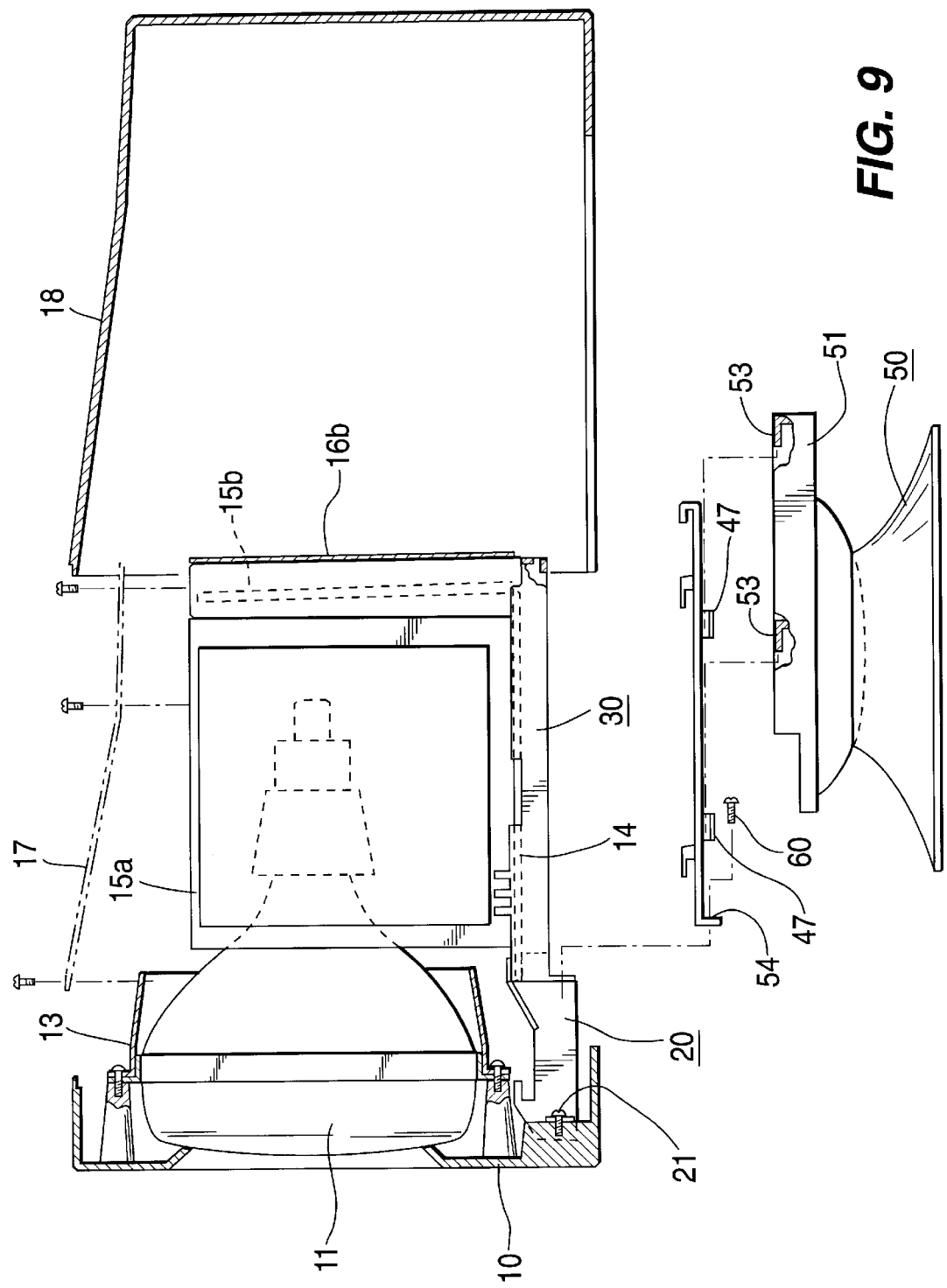

DISPLAY DEVICE AND METHOD OF ASSEMBLY

CLAIM OF PRIORITY

This application makes reference to, incorporates the same herein, and claims all rights accruing thereto under 35 U.S.C. §119 through my patent application entitled Display Apparatus earlier filed in the Korean Industrial Property Office on Nov. 21, 1996 and there duly assigned Ser. No. 1996/56175.

BACKGROUND OF THE INVENTION

1. Field of the Invention

The present invention relates to a display device and, more specifically, to a display device that simplifies the repair or the replacement of individual components of the main printed circuit board.

2. Background Art

A display device is generally constructed using a stand, a front housing, and a rear housing. The housings contain a cathode ray tube (CRT) and a printed circuit board (PCB). The increasing performance demands for display devices, resulting from widespread use of multi-media applications, has led to the development of various techniques to increase the overall quality of display devices. One method of enhancing monitor performance has been to supplement the main printed circuit board with additional side mounted printed circuit boards. This has resulted in display devices becoming bulkier and heavier while the internal components of the display devices have become even more intricate. Research targeted at improving the assembly and design of monitors is shown, by way of example, in: U.S. Pat. No. 4,459,640 to Latasiewicz entitled Display Mounting Assembly, U.S. Pat. No. 4,245,274 to Mac Donald entitled Readout and Circuit Board with Test Access, U.S. Pat. No. 5,122,928 to Lo entitled Monitor Housing, U.S. Pat. No. 5,575,545 to Wang entitled Monitor Shell, U.S. Pat. No. 5,419,629, to Korinsky entitled Electronics Chassis and Method of Manufacture Therefor, U.S. Pat. No. 5,045,974 to Ohkoshi entitled Display Tube Assembly and Mounting Process Thereof and U.S. Pat. No. 5,515,240 to Rodeffer entitled Self-Locking Housing Including Tabs that Bear Against the Sides of the Printed Circuit Board.

I have observed that the trend of increasing the size of display devices while using the intricate components necessary to increase performance has increased the difficulty of making repairs. The increasing difficulty is largely due to the increasing effort and care necessary to disassemble a monitor. This is especially true when the main printed circuit board must be tested or repaired. The main printed circuit board is typically located in the bottommost interior portion of the display device. Thus, to access the main PCB, one has to remove the rear housing, the side-mounted PCB assemblies, and the shields or guards that are also built into some display devices, and the multi-bracketed frame or stand assembly must be disassembled prior to removing the main PCB. Only after removing the main PCB can the board be turned over and the bottom soldered to repair and replace individual circuit components. I expect that a display device that simplified access to the main PCB would reduce the time necessary to make repairs, lower the cost of repairs, and increase the market competitiveness of the display devices.

SUMMARY OF THE INVENTION

Accordingly, it is an object of the present invention to provide an improved display device.

It is another object to provide a display device that requires less disassembly to access the main PCB.

It is still another object to provide a display device that reduces the cost of making repairs.

It is still another object to provide a display device that requires less time to make repairs or exchange individual components.

It is yet another object to provide a display device that has increased market competitiveness.

To achieve these and other objects, a display device may be constructed with a front housing that covers the front of a cathode-ray tube. A main PCB assembly is installed beneath the cathode-ray tube. The main PCB is supported by a PCB bracket that has a plurality of holes and is attached to a lower frame. The lower frame secures the front housing to the PCB bracket and the bottom bracket. A stand and stand base supports the display device and attaches to bottom bracket. Then, a rear housing is slidably engaged over the main PCB, the PCB bracket, the bottom bracket, and any side PCB assemblies. The type of connections used makes it very easy to remove both the stand and the bottom bracket to access the bottom of the main PCB assembly and, by removing the rear housing, one can access the top of the main PCB assembly.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 3 is a cross-sectional view of the CRT, CRT frame, front housing, and lower frame of the display device of FIG. 1;

FIG. 4 is a cross-sectional view of the device of FIG. 3 with the PCB bracket attached;

FIG. 5 is a cross-sectional view of the device of FIG. 4 with the bottom bracket attached;

FIG. 6 is a cross-sectional view of the device of FIG. 5 with the stand and stand base attached;

FIG. 7 is a cross-sectional view of the device of FIG. 6 with the side assemblies and rear assembly attached;

FIG. 8 is a cross sectional view of the device of FIG. 7 with the rear housing and side shields attached;

FIG. 9 is an exploded side view of the display device of FIG. 1 in a partially disassembled state.

DETAILED DESCRIPTION OF THE PREFERRED EMBODIMENT

Figure 1:
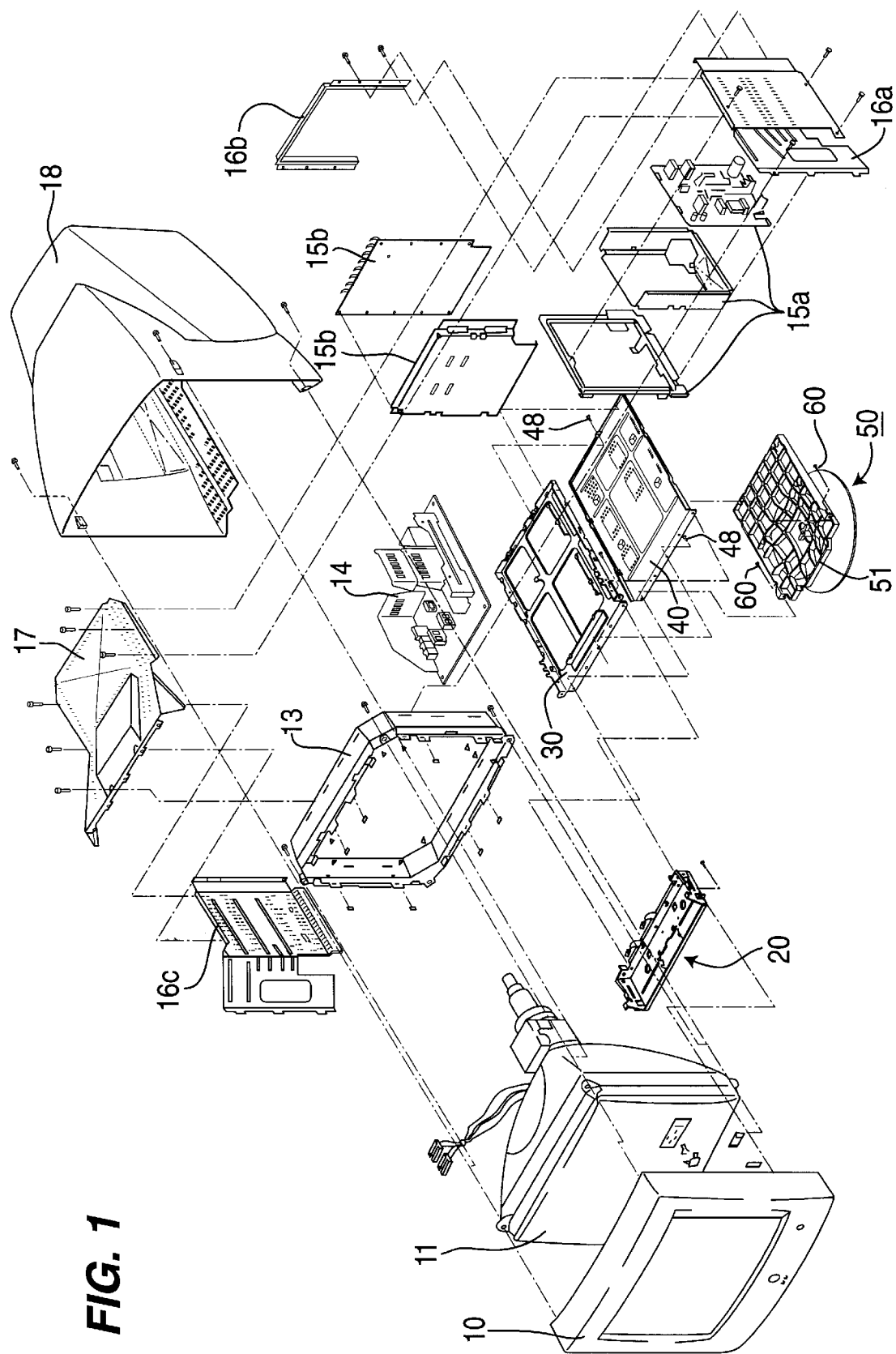
FIG. 1 is an exploded perspective view of a display device as constructed according to the principles of the present invention.

Turning now to the drawings, FIG. 1 illustrates a display device as constructed according to the principles of the present invention. Cathode-ray tube 11 and cathode-ray tube frame 13 are attached to front housing 10. Main PCB assembly 14 is supported by PCB bracket 30 and bottom bracket 40. Lower frame 20 secures both PCB bracket 30 and bottom bracket 40 to front housing 10. Side assembly 15a and side assembly 15b both attach to PCB bracket 30. The side assemblies may contain extra PCBs to enhance the display devices performance. Then side shields 16a and 16c are secured to opposing sides of both PCB bracket 30 and CRT frame 13. Rear shield 16b is attached to both side shields 16c and 16a, and top shield 17 is also attached. Stand 50 supports the display device with stand base 51 attached to the bottom bracket 40. Then rear housing 18 is attached over all the assemblies and fastened to both CRT 11 and front housing 10.

Figure 2:
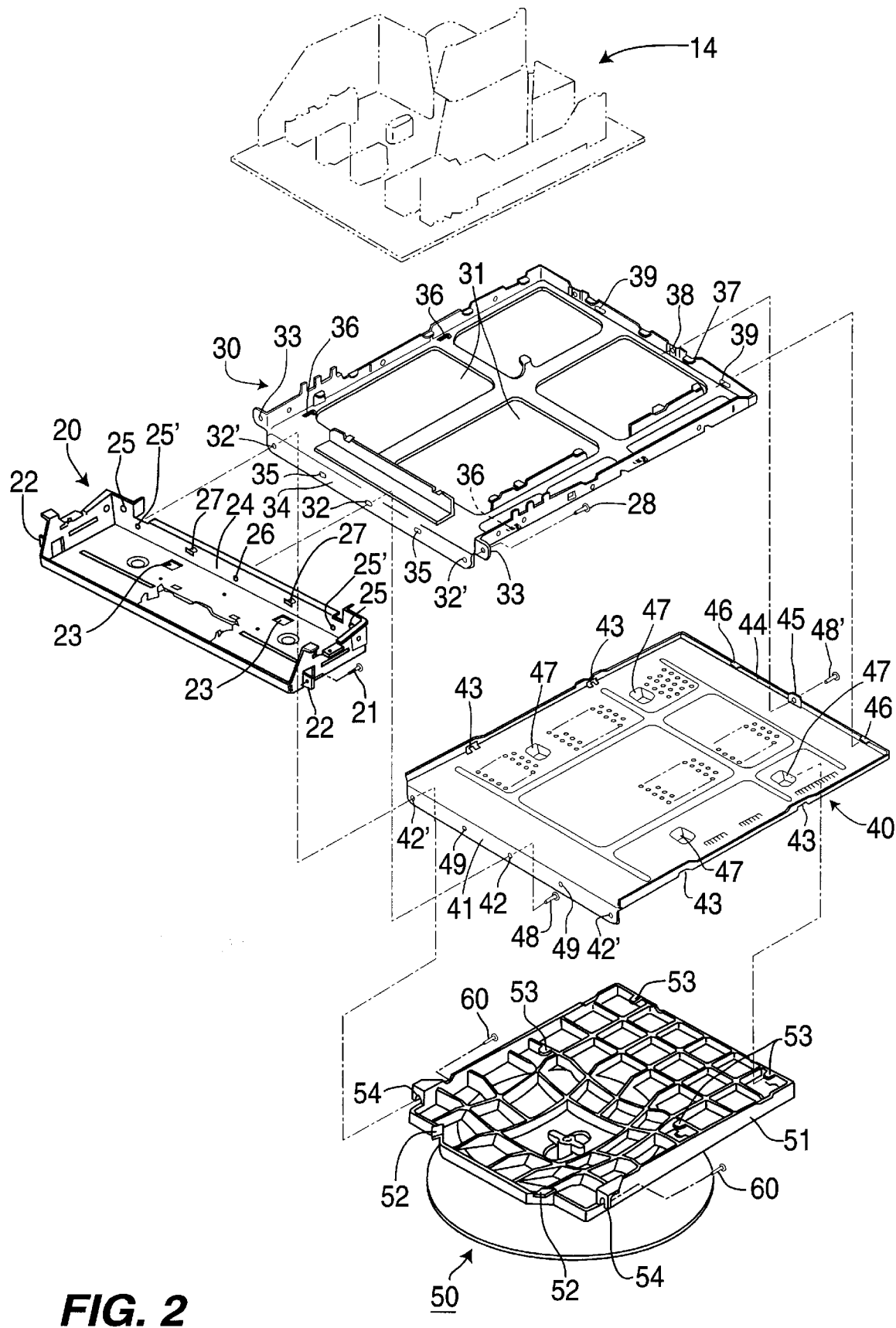
FIG. 2 is an exploded perspective view of the salient features of the display device of FIG. 1.
Figure 2A:
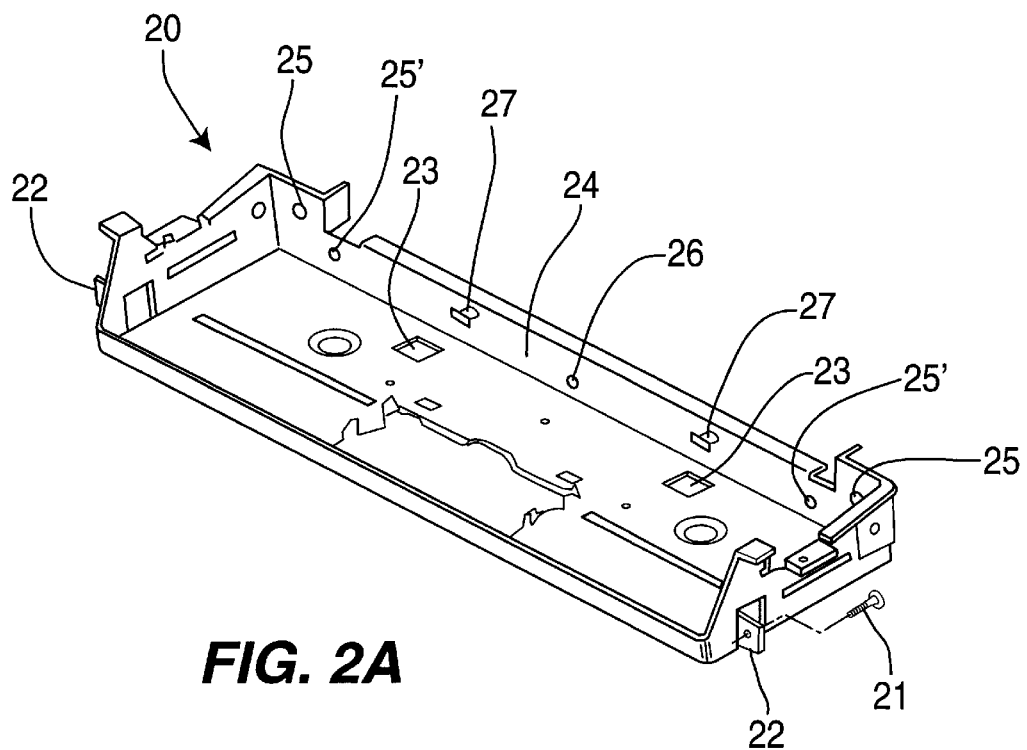
FIG. 2A is a perspective view of the lower frame of the display device of FIG. 1.
Figure 2C:
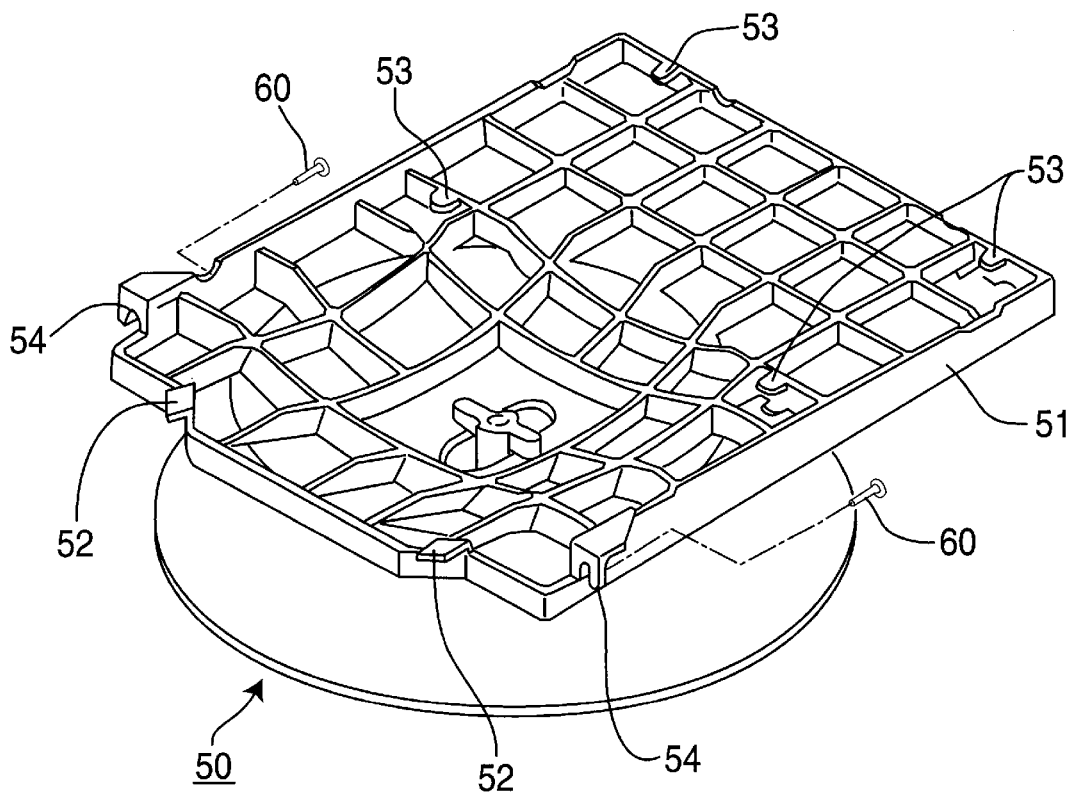
FIG. 2c is a perspective view of the stand of the display device of FIG. 1.
Figure 2B:
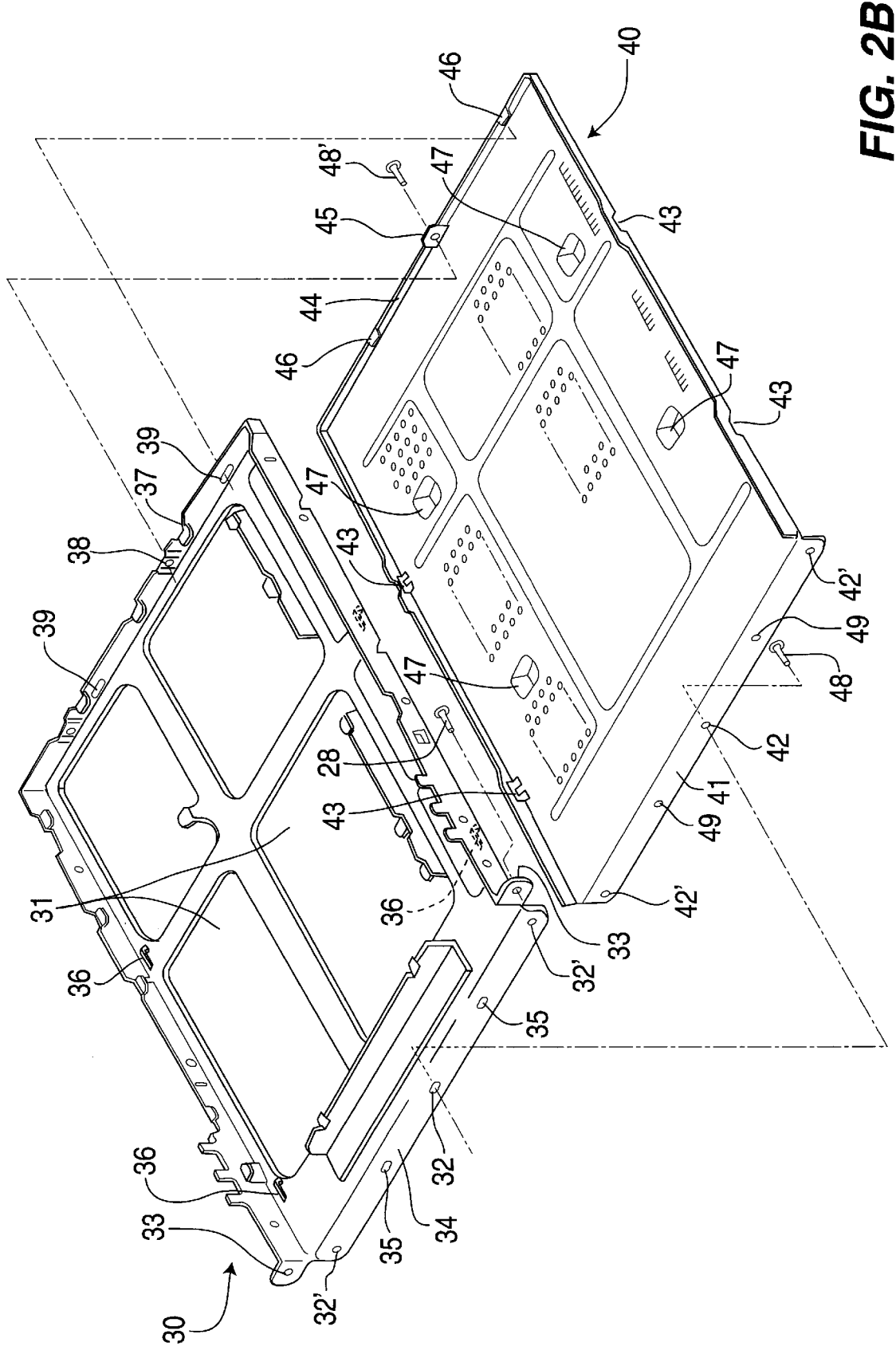
FIG. 2B is a perspective view of the PCB bracket and the bottom bracket of the display device of FIG. 1.

FIG. 2 shows the salient features of the improved display device, while FIGS. 2A or 2B are perspective views of the lower frame and PCB and bottom brackets, respectively, of FIG. 1. Lower frame 20 has two side brackets 22 that are attachable to the lower portion of front case 10 using fasteners 21. The fasteners can be any type of screw, rivet, bolt, or the like. Holes 23 allow latching protrusions 52 to interlock with lower frame 20 with stand base 51. The lower frame has a rear brace 24 that has latching projections 27, side coupling holes 25 and 25', and central coupling hole 26.

PCB bracket 30 has two side flanges 33 that couple with lower frame 20 using fasteners 28. The PCB 30 bracket has a front flange 34 that has side fastener receiving holes 32', central fastener receiving hole 32, and guide holes 35 into which latching projections 27 of lower frame 20 are inserted. PCB bracket 30 has a plurality of hook receiving holes 36 oppositely positioned on the sides of the PCB bracket 30 perpendicular to the lower fame's rear brace 24. The hook holes 36 are used to allow bottom bracket 30 40 to attach to the PCB bracket. Rear wall 37 of the PCB bracket 30 has fastener receiving hole 38 and rear hook receiving holes 39. A plurality of holes 31 exposing the bottom of the main PCB assembly 14 are located in the lower surface of PCB bracket 30.

Bottom bracket 40 has a front flange 41 that is fastened to PCB bracket 30. The front flange has central fastener receiving hole 42, side fastener receiving holes 42', and holes 49. Bottom bracket 40 is attached to lower frame 20 that attaches to PCB bracket 30 and the three components are held together by fastener 48. Rear wall 44 of bottom bracket 40 has a central flange 45 that is fastened to PCB bracket 30 using fastener 48'. Rear hooks 46 are located on the rear wall of bottom bracket 40 and are inserted into hook receiving holes 39 in the PCB bracket. A plurality of protruding hooks 43 are located on the sides of bottom bracket 40 and can be inserted into hook receiving holes 36 of PCB bracket 30. Bottom bracket 40 also has a plurality of slots 47 formed in the lower surface that latching protrusions 53 of stand base 51 can use to interlock the bottom bracket 40 with the stand. The front flange 41 of bottom bracket 40 has assembling holes 49 that receive coupling guides 27 that have passed through guide holes 35. A main PCB assembly 14 is installed onto PCB bracket 30 before the connecting of front flange 34 to rear brace 24 of lower frame 20.

Figure 3:
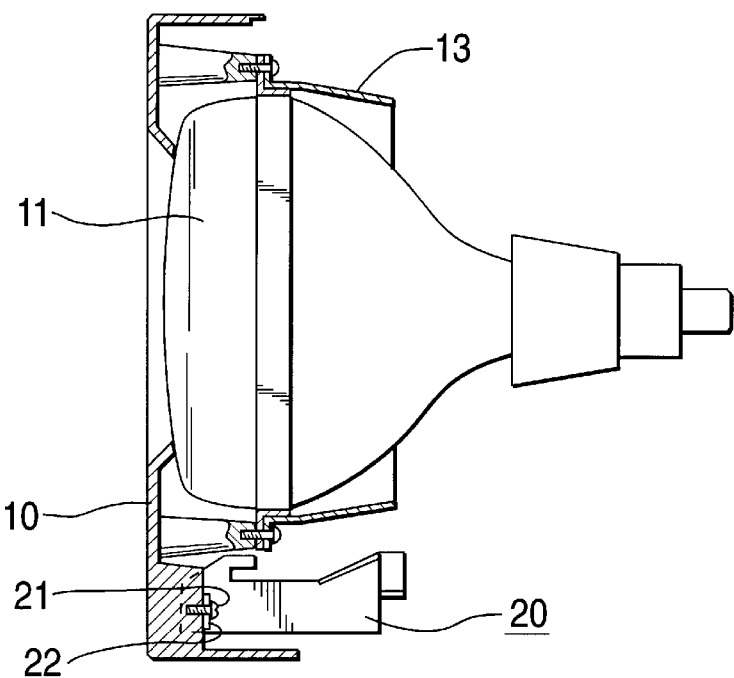
FIGS. 3–8 are sequential, cross-sectional views illustrating the assembly of the display device of FIG. 1.

Stand 50 has two flanges 54 for interlocking the stand 50 with the lower frame via bottom bracket 40 using fasteners 60. Also included in the assembly of the display device are side shields 16a and 16c, rear shield 16b, and top shield 17 that protect side PCB assemblies 15a and 15b. An additional side-mounted PCB assembly (opposite 15a) is generally part of the display device, but has been omitted from the drawings. The assembly process for a display device constructed according to the principles of the present invention is shown in FIGS. 3 through 8. To start with, as shown in FIG. 3, lower frame 20 is connected to front housing 10. The side brackets 22 of lower frame 20 are secured to the front housing 10. By using the screws 21, the side brackets of the lower frame 20 are secured to the front case 10 using fasteners. The cathode-ray tube 11 and cathode-ray tube frame 13 are connected using fasteners also.

Figure 4:
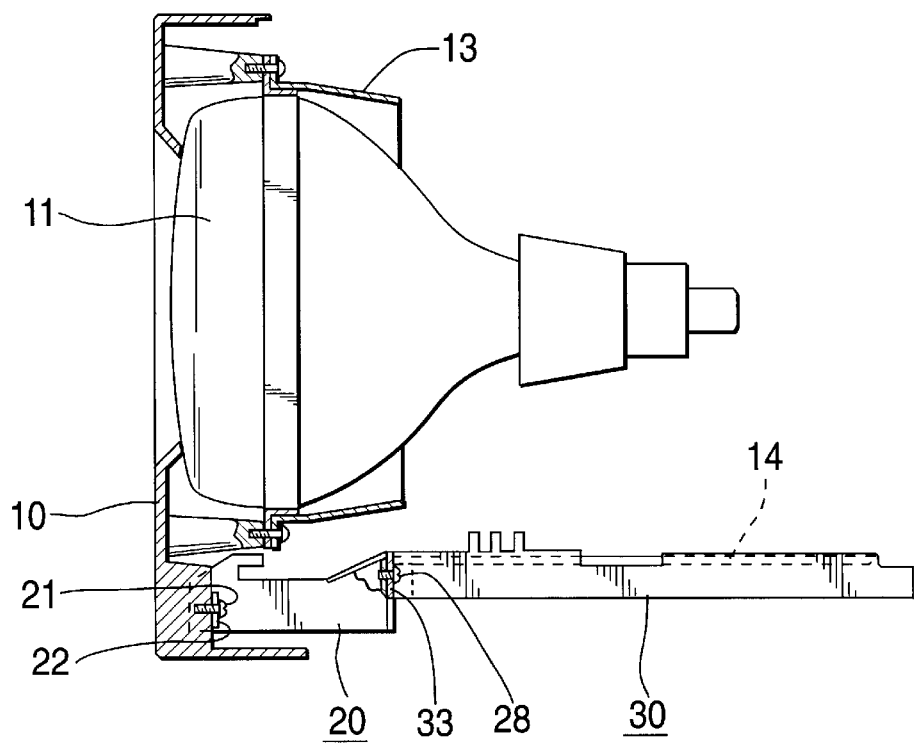

FIG. 4 illustrates the display device after the PCB bracket 30 is attached. The PCB bracket 30 is fixed to the rear of lower frame 20. Here, coupling guides 27 of lower frame 20 are inserted into guide holes 35 of PCB bracket 30. Thus, coupling holes are aligned as follows: 25' with 32, 27 with 35, 26 with 32, and 25 with 33.

Figure 5:
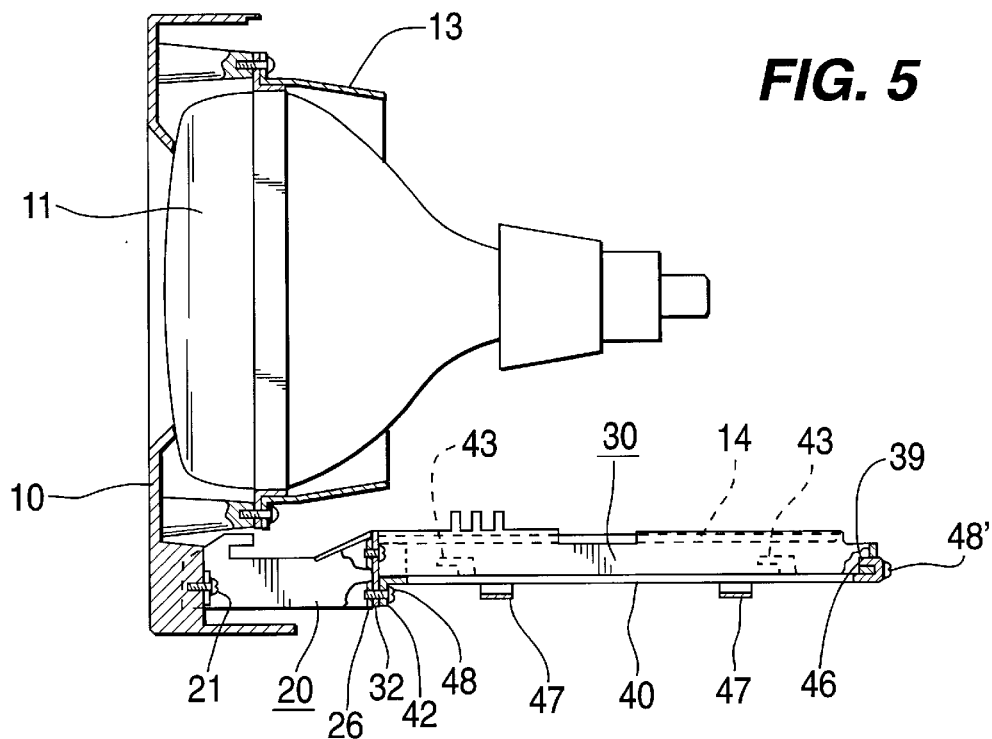

FIG. 5 illustrates the attaching of bottom bracket 40 to the PCB bracket 30. First, the bottom bracket 40 is attached to the bottom of PCB bracket 40 30. Then the bottom bracket is attached to lower frame 20. To attach the bottom bracket 40 to the PCB bracket, bottom bracket 40 is pushed upward against the PCB bracket 30 so that protruding hooks 43 are inserted through hook receiving holes 36. Then, the bottom bracket 40 is slid forward toward lower frame 20. This causes protruding hooks 43 of bottom bracket 40 to engage the PCB bracket 30. With the bottom bracket 30 securely held onto the PCB bracket 30 the two brackets are ready to be fastened together. Central coupling holes 26, 32 and 42 are now in alignment so that a fastener can further secure lower frame 20, PCB bracket 30, and bottom bracket 40 together. Bottom bracket and PCB 40 bracket can be further fastened by fastener 48' inserted through aligned fastener receiving hole 38, located at the rear of PCB bracket 30, and central flange 45, located on bottom bracket 40. As an alternative to the above assembling process, bottom bracket 40 may be secured to PCB bracket 30 before attaching lower frame 20.

Figure 6:
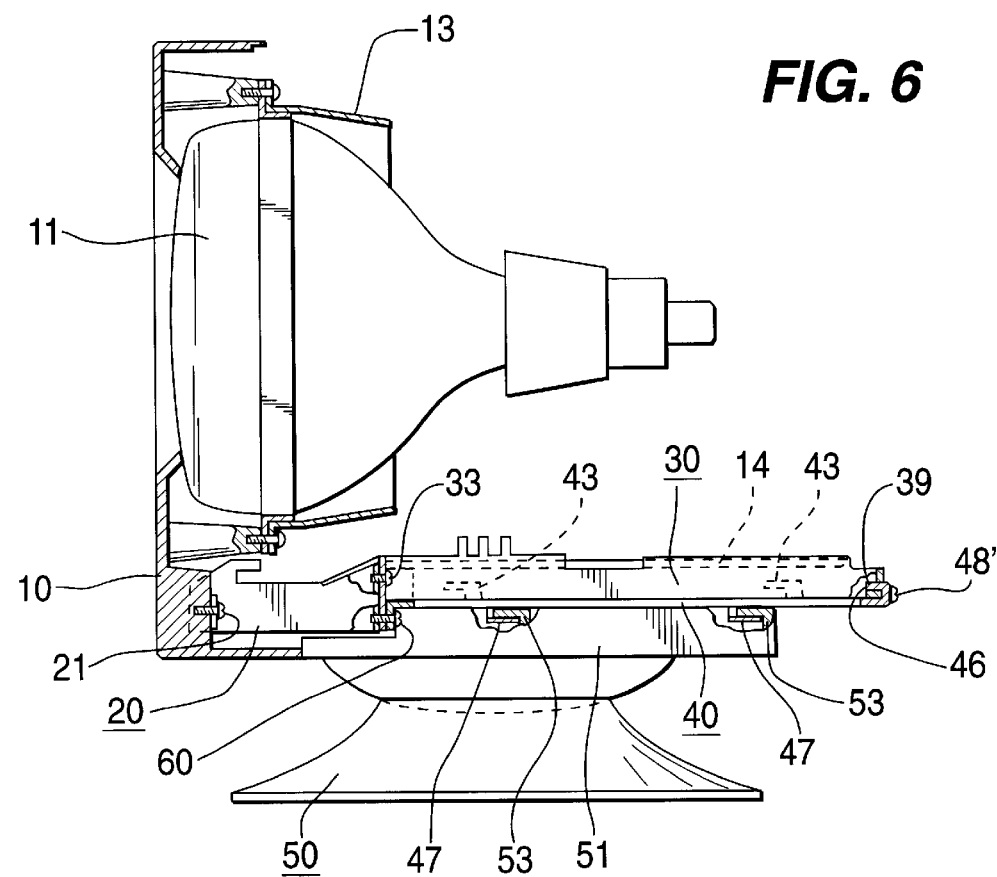

In FIG. 6, stand 50 is attached to bottom bracket 40. Here, latching protrusions 52 on stand base 51 are inserted into lower frame 20 and locking protrusions 53 of the stand base 51 are inserted into the slots 47 of bottom bracket 40. Then, stand base 51 is pushed forward and locked into position, thus aligning flanges 54 with side coupling holes 42', 32' and 25', so that stand 50 may be fastened to the entire assembly using fasteners 60. These fasteners are inserted through bottom bracket 40, PCB bracket 30, and into lower frame 20.

Figure 7:
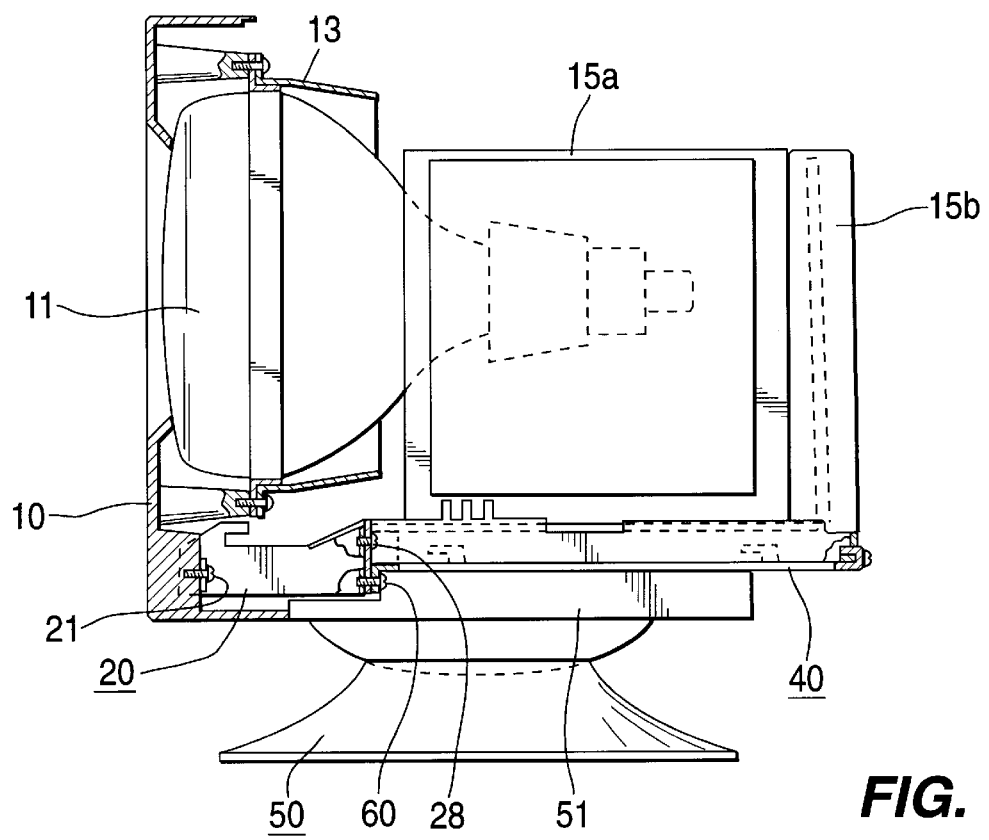
Figure 8:
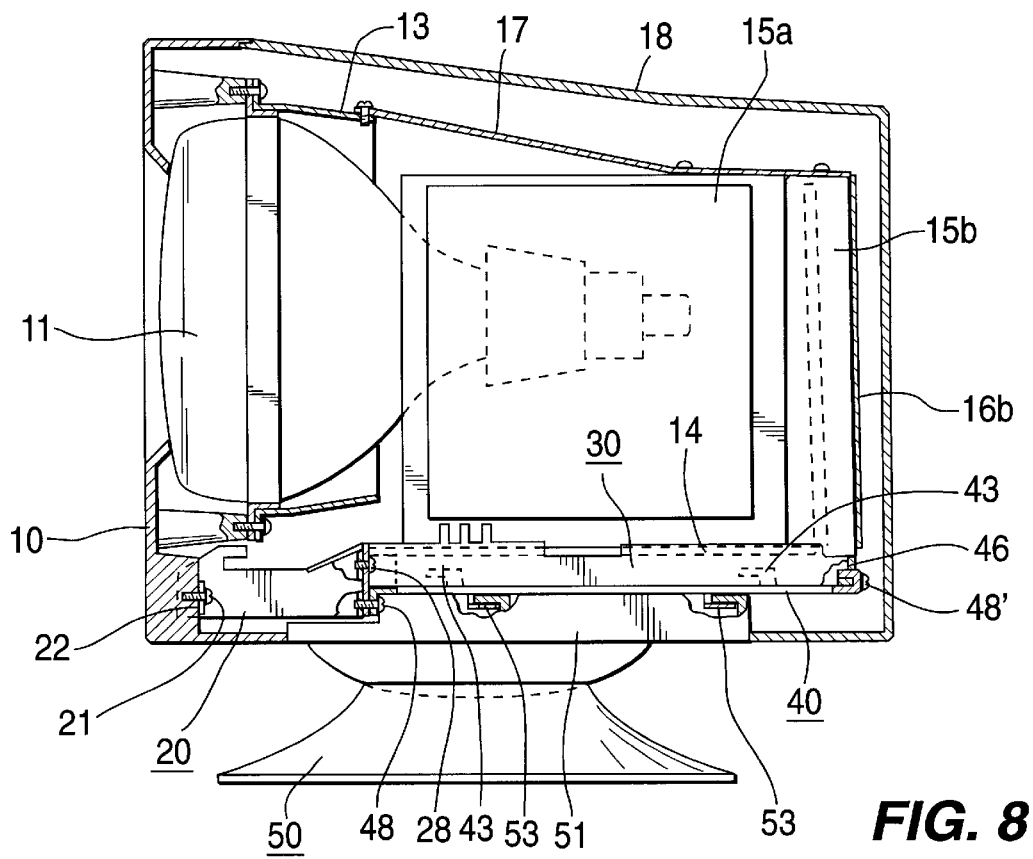

FIG. 7 shows the display device further assembled with side PCB assemblies 15a and 15b, as well as the third-side PCB assembly (not shown), mounted to the periphery of PCB bracket 30. FIG. 8 shows the display device with top shield 17, side shields 16a and 16c, rear shield 16b, and rear housing 18 attached. The shields 16 a–16c and 17 are fastened into place and then the rear housing is attached over the entire assembly.

FIG. 9 shows a display device constructed according to the principles of the present invention partially disassembled to facilitate repairing the main PCB assembly. With rear housing 70 separated from the display device and laid aside, fasteners 60 may be removed to allow stand base 50 to be pulled rearward and separate the stand from the main assembly. In removing the stand, latching protrusions 52 are separated from holes 23 on lower frame 20 and latching protrusions 53 are removed from slots 47 on bottom bracket 40. Then, after fasteners 48 and 48' are removed, bottom bracket 40 is pulled back and downward, thus unlocking hooks 43 and 46 from hook receiving holes 36 and 39 on PCB bracket 30.

Once the bottom bracket 40 is removed, holes 31 in PCB bracket 30 expose the bottom of the main PCB assembly to make the PCB assembly accessible for the testing or the repairing of individual circuit components. If top shield 17 is removed, then the top circuit components on main PCB assembly 14 can be also accessed. Thus, the testing and repairing of the main PCB assembly can be achieved in a more efficient manner than previously possible. This monitor does not require the separating of any side PCB assemblies from PCB bracket 30 to repair, test, and repair components. By reversing the above steps, reassembly of the monitor after the required maintenance is completed.

This improved monitor constructed according to the preferred embodiment simplifies maintenance, lowers costs, increases efficiency, and increases the market competitiveness of the display devices. Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A display device, comprising:
   a stand supporting a bottom bracket;
   a printed circuit board bracket supported by said bottom bracket, said printed circuit board bracket supporting a main printed circuit board assembly and having a plurality of apertures exposing a bottom side of said main printed circuit board assembly;
   a lower frame attached to said bottom bracket and said printed circuit board bracket;
   a first side printed circuit board assembly attached to any one of said printed circuit board bracket and a second side printed circuit board assembly;
   a housing having a first portion and a second portion, said first portion attached to said lower frame and covering a cathode ray tube;
   said second portion of said housing covering said main printed circuit board assembly, said first and second side printed circuit board assemblies, said printed circuit board bracket, and said bottom bracket;
   a top side of said main printed circuit board assembly being exposable without removing said side printed circuit board assemblies, by removing said second portion of said housing; and
   said bottom side of said main printed circuit board assembly being exposable without removing said first and second side printed circuit board assemblies, by removing said second portion of said housing, said stand, and said bottom bracket.

2. The display device of claim 1, further comprising:
   a cathode ray tube frame fastened to said first portion of said housing;
   a plurality of side shields attached to said cathode ray tube frame and said printed circuit board bracket; and
   a top shield attached to said side shields and said cathode ray tube frame;
   said second portion of said housing covering said side and top shields.

3. The display device of claim 1, wherein said stand has a base and an interface rotatably attached opposite to said base, said interface having a plurality of latches protruding from a front edge and a plurality of catches extending away from said base.

4. The display device of claim 1, said bottom bracket being supported by an interface and having a plurality of slots, said bottom bracket having a first flange attached along a front edge and a first wall attached along a rear edge, said first wall containing a bore and a plurality of blades projecting inward from said first wall, said first flange having a first plurality of circular perforations.

5. The display device of claim 4, said interface-being connectable with said bottom bracket by a plurality of catches of said interface engagable with said plurality of slots in said bottom bracket to slidably secure said bottom bracket to said interface.

6. The display device of claim 4, said printed circuit board bracket having a second flange attached along said front edge, said second flange having a second plurality of circular perforations, said printed circuit board bracket having a second wall attached along said rear edge, said second wall having a plurality of bores.

7. The display device of claim 1, said bottom bracket being engagable with said printed circuit board bracket by a plurality of blades of said bottom bracket, said plurality of blades latchably engaging a plurality of bores in said printed circuit board bracket, said printed circuit board bracket being fastened to said bottom bracket by a fastener inserted through a bore in said bottom bracket and through one of said plurality of bores in said printed circuit board bracket.

8. The display device of claim 7, wherein said plurality of fasteners, of bolts, screws and rivets.

9. The display device of claim 1, said lower frame having a plurality of bores and a plurality of projections for aligning said lower frame with said bottom bracket and said printed circuit board bracket or fastening.

10. The display device of claim 1, said lower frame being attachable to said bottom bracket and to said printed circuit board bracket by a plurality of projections on said lower frame inserted through said printed circuit board bracket and through said bottom bracket, a plurality of fasteners inserted through a plurality of circular perforations in a flange of said bottom bracket, then through a first plurality of bores in a flange of said printed circuit board bracket, and then through a second plurality of bores in said lower frame, a plurality of latches of said bottom bracket being inserted into said second plurality of bores in said lower frame.

11. A display apparatus comprising:
    a front case for housing a cathode-ray tube on which images are displayed;
    a main printed circuit board assembly installed beneath said cathode-ray tube;
    a lower same secured to said front case;
    a printed circuit board bracket secured to said lower frame for holding said main printed circuit board assembly, and having a plurality of apertures exposing a bottom side of said printed circuit board assembly;
    a bottom bracket having first assembling means for coupling with said printed circuit board bracket; and
    a stand supporting said display apparatus and having a second assembling means for securing to said lower frame while being interlocked with said printed circuit board bracket and said bottom bracket.

12. The display apparatus as claimed in claim 11, further comprising alignment means for aligning said printed circuit board bracket and said bottom bracket with said lower frame.

13. The display apparatus as claimed in claim 12, wherein said alignment means comprises:
    coupling protrusions formed on said lower frame; and
    coupling holes formed 1 said printed circuit board bracket and said bottom bracket, respectively.

14. The display apparatus as claimed in claim 11, wherein said plurality of apertures in said printed circuit board bracket allows access to the bottom side of said main printed circuit board assembly held by said printed circuit board bracket when said bottom bracket is separated from the display apparatus.

15. The display apparatus as claimed in claim 11, wherein said first assembling means comprises primary and secondary fixing elements.

16. The display apparatus as claimed in claim 15, wherein said primary fixing elements comprise a plurality of hook holes formed in said printed circuit board bracket and a plurality of hooks formed on said bottom bracket, thereby allowing said bottom bracket to be manually coupled to said printed circuit board bracket.

17. The display apparatus as defined in claim 15, wherein said secondary fixing elements comprise front and rear flanges provided on opposite ends of said bottom bracket, and serving to secure said bottom bracket to said printed circuit board bracket.

18. The display apparatus as defined in claim 11, wherein said second assembling means comprises a flange provided on a side of said stand, and serving to secure said stand, said bottom bracket and said printed circuit board bracket concurrently.

19. The display apparatus as claimed in claim 11, further comprising a top shield for protecting the cathode-ray tube, wherein access to a top of said main printed circuit board assembly is sustained by removal of said top shield and access to a bottom surface of said main printed circuit board assembly is sustained by removal of said stand and said bottom bracket.

20. A process for assembling a display device, comprising the steps of:

attaching a first portion of a housing to a cathode ray tube;

fastening a lower frame to said front portion of said housing;

fastening a printed circuit board bracket and a bottom bracket to said lower frame, said printed circuit board bracket supporting a main printed circuit board assembly and having a plurality of apertures exposing a bottom side of said main printed circuit board assembly;

fastening a first side printed circuit board assembly to one of said printed circuit board bracket and a second side printed circuit board assembly;

sliding a second portion of said housing over said first and second side printed circuit board assemblies, said main printed circuit board assembly, said printed circuit board bracket, and said bottom bracket, said second portion of said housing being removable to expose a top side of said main printed circuit board assembly without removal of said first and second side printed circuit board assemblies; and slidably engaging a stand to said bottom bracket, said stand and said bottom bracket being removable to expose said bottom side of said main printed circuit board assembly without removal of said first and second side printed circuit board assemblies.

21. The process of claim 20, further comprising the step of attaching a plurality of shields around sides and on top of the main printed circuit board assembly before sliding said second portion of said housing over said first and second side printed circuit board assemblies.

22. The process of claim 20, further comprising the steps of providing a cathode ray tube frame and attaching said first portion of said housing to said cathode ray tube frame.

* * * * *